(12) United States Patent
Roberts et al.

(10) Patent No.: US 8,297,541 B2
(45) Date of Patent: Oct. 30, 2012

(54) DUST REDUCTION IN DELIVERY OF PARTICULATE COMMODITIES

(75) Inventors: Alan W. Roberts, Newcastle (AU); Tobias Krull, Newcastle (AU); Stephen J. Wiche, Newcastle (AU); Craig A. Wheeler, Newcastle (AU)

(73) Assignee: The University of Newcastle Research Associates Limited, Callaghan (AU)

( * ) Notice: Subject to any disclaimer, the term of this patent is extended or adjusted under 35 U.S.C. 154(b) by 0 days.

(21) Appl. No.: 11/734,585

(22) Filed: Apr. 12, 2007

(65) Prior Publication Data

US 2007/0251385 A1 Nov. 1, 2007

Related U.S. Application Data

(60) Provisional application No. 60/791,669, filed on Apr. 13, 2006.

(51) Int. Cl.
*B05B 1/26* (2006.01)
*A01C 3/06* (2006.01)
*E01C 19/20* (2006.01)
*B67C 11/04* (2006.01)
*B65G 11/00* (2006.01)

(52) U.S. Cl. ........ 239/651; 239/505; 239/509; 239/521; 239/650; 141/339; 141/370; 193/2 R; 414/291

(58) Field of Classification Search .......... 239/505, 239/507, 509, 513, 518, 521, 523, 589, 595, 239/650, 658, 689, 651, 657, 668, 669; 95/267, 95/272; 55/462, 465; 193/2 R, 3, 11, 2 A, 193/4, 5, 9, 25 A, 25 E, 25 R, 25 FT; 414/291; 141/339, 365, 369, 370, 371

See application file for complete search history.

(56) References Cited

U.S. PATENT DOCUMENTS

| | | | | | |
|---|---|---|---|---|---|
| 232,597 | A | * | 9/1880 | Coleman | 193/3 |
| 2,297,239 | A | * | 9/1942 | Neugebauer et al. | 60/225 |
| 2,916,441 | A | | 12/1959 | Kruse, Jr. | |
| 3,555,794 | A | * | 1/1971 | Gable et al. | 56/30 |
| 4,009,912 | A | * | 3/1977 | Mraz | 406/144 |
| 4,018,210 | A | * | 4/1977 | Christophel | 126/522 |
| 4,061,221 | A | * | 12/1977 | Higashinaka et al. | 198/524 |
| 4,397,423 | A | * | 8/1983 | Beaver et al. | 239/684 |
| 4,779,586 | A | * | 10/1988 | White, Jr. | 123/198 E |
| 4,915,258 | A | * | 4/1990 | Olson | 221/211 |
| 5,306,330 | A | * | 4/1994 | Nasikas | 95/267 |
| 7,228,956 | B2 | | 6/2007 | Pircon et al. | |

\* cited by examiner

*Primary Examiner* — Len Tran
*Assistant Examiner* — Ryan Reis
(74) *Attorney, Agent, or Firm* — Marshall, Gerstein & Borun LLP

(57) ABSTRACT

Apparatus for reducing dust emissions from particulate commodities such as wheat or coal using a curved loading spoon connected to the discharge from a loading spout. The curved loading spoon turns particulate commodities delivered at a rate above a predetermined delivery velocity against a curved outer wall causing dust arising from the particulate commodities to be re-entrained within the commodities as they are diverted from a straight path by the curvature. Also described are an optional flap designed to rest just above the surface of the commodities stream adjacent the outlet, and a converging duct located upstream of the curve loading spoon and arranged to direct commodities against the curved outer wall adjacent the inlet.

Figure 1:
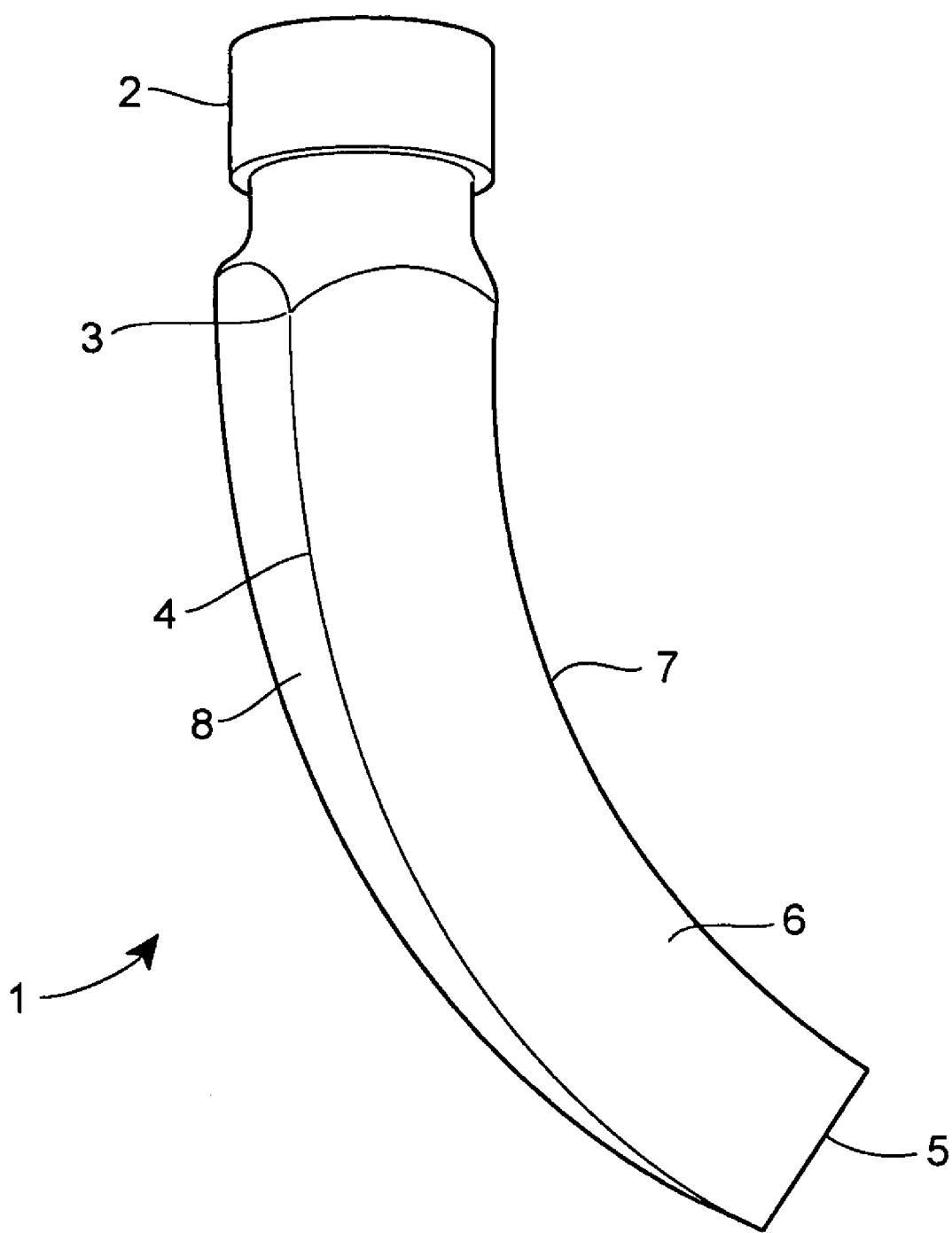

11 Claims, 4 Drawing Sheets

DUST REDUCTION IN DELIVERY OF PARTICULATE COMMODITIES

RELATED APPLICATIONS

This application claims priority from U.S. Provisional Application Ser. No. 60/791,669, the contents of which are expressly incorporated by reference herein for all purposes.

FIELD OF THE TECHNOLOGY

This disclosure relates to dust reduction in delivery of particulate commodities and, more particularly, to reduce the amount of dust issuing into the atmosphere from the discharge nozzles of grain loaders such as those used for loading wheat into ships or other vessels.

BACKGROUND

There are many instances where particulate material are delivered through chutes or other discharge devices to various destinations, where dust is released from the particulate commodities causing an environmental hazard or a nuisance from pollution or contamination. Such instances may include the delivery of grains such as wheat or corn from silos or other holding vessels into the holds of ships or railway cars, or the transfer of other particulate commodities such as coal from one conveyor to another or to a required delivery point or stockpile.

It has been recognized that the dust typically entrained with such particulate commodities, also known as fines, are prone to be emitted from the product stream as dust during handling, which at the least can be a nuisance due to cleanliness requirements, or at the worst can form an environmental hazard. One recognized way of controlling dust in these situations is to reduce the velocity of the product stream to keep the relative velocity of the air stream over the product below the minimum pick up velocity of the dust, but such an approach has the disadvantage of limiting the rate at which particulate product can be delivered to the destination, and hence is a limitation on the efficiency of the process.

SUMMARY

In one aspect, an apparatus for reducing dust emissions from particulate commodities during discharge from an outlet includes a curved duct having an inlet and the outlet, and a delivery source arranged to deliver particulate commodities to the inlet at least at a predetermined delivery velocity, where the curvature of the curved duct is arranged in combination with said delivery velocity to cause dust arising from the particulate commodities to be re-entrained within the commodities as the commodities are diverted from a straight path by the curvature of the duct.

In another aspect, the curved duct includes a substantially rectangular cross-section with substantially flat side walls, a curved inner wall corresponding to an inner radius portion of the curved duct and a curved outer wall corresponding to an outer radius portion of the curved duct.

In a further aspect, the radius of curvature of the inner and outer walls is substantially constant throughout the curve.

In yet another aspect, a radius of curvature of the inner and outer walls varies over the curve such that curvature of the duct is parabolic.

In yet a further aspect, a tighter radius portion of the parabolic curve is positioned adjacent the inlet.

In still another aspect, the delivery source includes a converging duct located adjacent the inlet to the curved duct, and arranged to deliver the particulate commodities into the curved duct at a location adjacent the curved outer wall.

In a still further aspect, an air-restrictive flap extending inwardly into the curved duct from the curved inner wall adjacent the outlet, the flap including a trailing edge arranged to rest in use just above the stream of particulate commodities issuing from the outlet.

In another aspect, the flap is hingedly connected to the curved inner wall such that the trailing edge can move toward or away from the curved outer wall depending on the volume of particulate commodities passing therebeneath at any point in time.

In a further aspect, the trailing edge portion of the flap is flexible to automatically allow for changes in the mass flow rate of particulate commodities passing therebeneath.

BRIEF DESCRIPTION OF THE DRAWINGS

FIG. 1 is a perspective view of a grain discharge spoon having a substantially constant radius in accordance with an aspect of the disclosure;

FIG. 2 is a perspective view of a grain discharge spoon having a parabolic configuration in accordance with another aspect of the disclosure;

FIG. 3 is a diagrammatic cross-sectional view of a constant radius grain delivery spoon with an air restriction flap in accordance with another aspect of the disclosure; and FIG. 4 is a diagrammatic cross-sectional view of a converging duct located adjacent the inlet to a grain delivery spoon in accordance with another aspect of the disclosure.

DETAILED DESCRIPTION

Notwithstanding any other forms that may fall within its scope, numerous different embodiments will now be described by way of example only with reference to the accompanying drawings.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The following disclosure seeks to restrict the emission of dust from particulate commodities during delivery, by utilizing the velocity of the product stream to re-entrain the dust within the product. In one example, the apparatus for reducing dust emissions from particulate commodities during discharge from an outlet will be described in the context of a grain handling ship loader where wheat is delivered down an inclined or substantially vertical duct or pipe to a curved duct which forms a delivery or discharge spoon for the discharge of the particulate commodities emitted as a product stream into a stockpile, such as a stockpile in the hold of a ship, though it should be understood the apparatus may be applied to other instances involving delivery of particulate commodities, such as delivery to other vessels.

In the context of a grain handling ship loader, particulate commodities such as grain in the form of wheat are generally fed through conveyor mechanisms into a loading spout which may be an inclined or vertically extending tube or duct which drops the wheat from an overhead gantry into the hold of a ship. The discharge end of the loading spout may be provided with a discharge spoon, otherwise known as a loading spoon, which may have an angled portion at the end in order to direct the grain being discharged at an angle from the loading spout and enable grain to be directed under the coamings of the hold of a ship. However, it should be understood that other delivery sources, other than a loading spout 2 may be utilized, including, but not limited to, a chute, a conveyor, or a loading bucket. Further, loading spoons may be provided with top impact plates and sometimes spring loaded gates in an attempt to control the flow rate of grain through the loading spoon in the belief that this would reduce dust emissions.

As discussed with reference to the following example, the velocity of the grain passing down the loading spout can be utilized to re-entrain airborne dust into the body of the product stream. This is achieved by connecting a curved loading spoon 1 to the discharge from the loading spout 2 such that product enters through an inlet 3 into a curved duct 4 before being discharged from an outlet 5.

The curved duct 4 may be of different cross-sections, but is shown in FIG. 1 as rectangular in cross-section having substantially flat side walls 6 and a curved inner wall 7 and curved outer wall 8.

As well as directing the product stream issuing from the outlet 5 at an angle to the loading spout 2, the curved loading spoon serves to direct the particulate product against the curved outer wall 8 such that the inertia in the entrained dust stream sitting above the product stream causes the dust to be re-entrained into the product stream, as the product stream curves up toward the dust layer.

Figure 2:
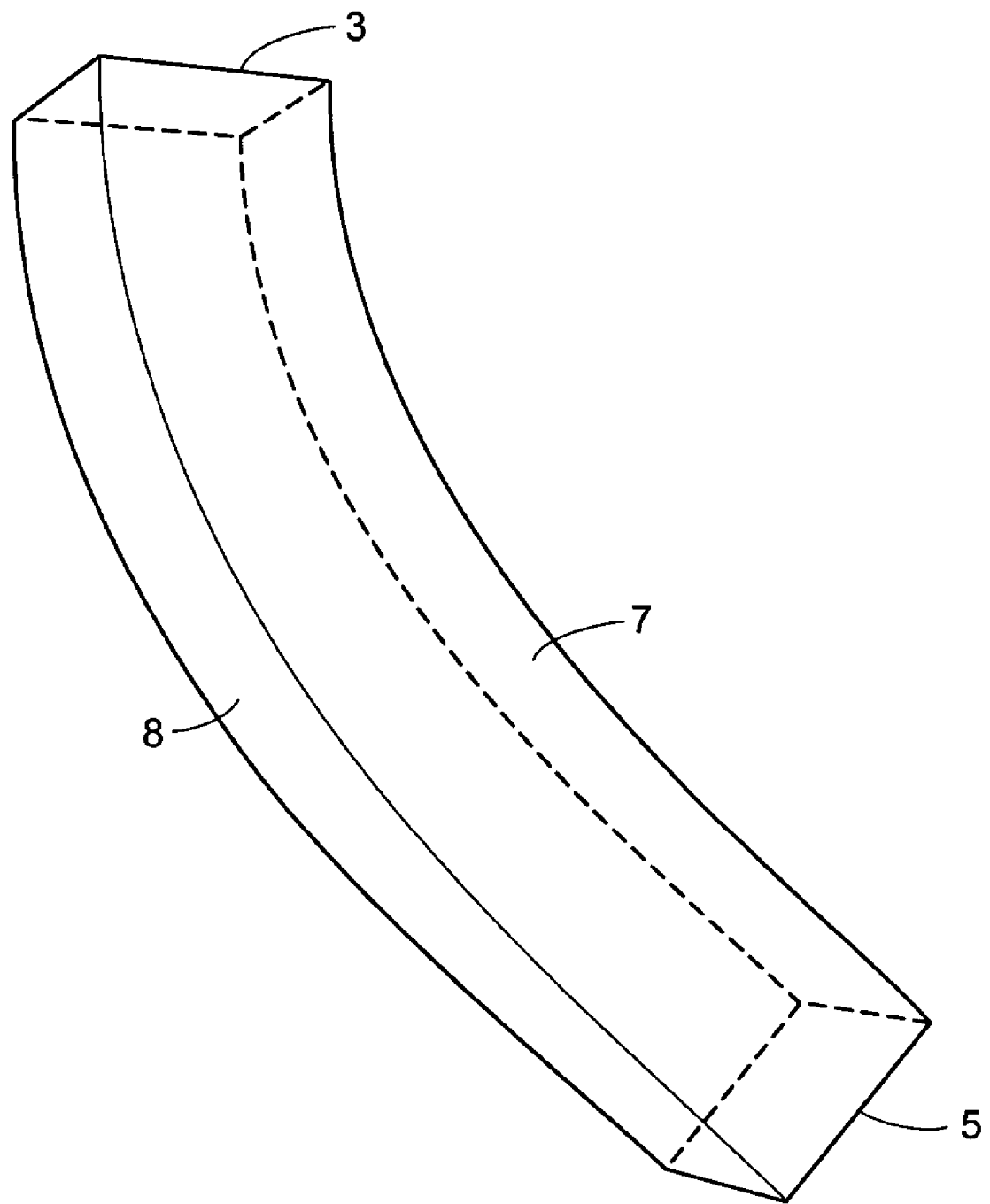

The nature of the curvature of the duct 4 does not appear to be critical and the principle has been found to work well with either a constant radius curved duct as shown in FIG. 1 or a duct formed to a parabolic curved as shown in FIG. 2 where the radius of curvature adjacent the inlet 3 is less than the radius of curvature adjacent the outlet 5.

Discharge spoons incorporating a curve in this manner have shown a significant reduction in airborne dust compared with spoons without the curvature. The product stream exiting the disclosed spoon is very well defined with a sharp boundary layer between the air and the grain. The flow rate of the grain is not reduced and in experimental laboratory development was estimated to be approximately 4.5 to 5 metres per second. In a full scale application, the flow rate is in the order of 7 to 8 meters per second with a large velocity component in the horizontal direction at the point of discharge. This increases the reach of the grain discharged from the spoon without having to incline the vertical loading spout and enhances the ability of the operator to place grain under the coamings of ship holds.

The average dust concentration level in experimental testing showed more than a 50% reduction in dust compared with existing loading spoons. This reduction in dust levels is attributed to the concentrated product stream keeping the dust entrained within the product.

Similar test results were obtained whether the curved duct is of a constant radius as shown in FIG. 1 or of a parabolic configuration as shown in FIG. 2.

In order to further enhance the dust entrainment in the product, an optional air restrictive flap 9 can be incorporated into the design of the discharge spoon. For a given grain mass flow rate, the flap is designed to rest just above the grain stream surface shown in broken outline at 10 (FIG. 3) at the point just before the grain exists through outlet 5.

Figure 3:
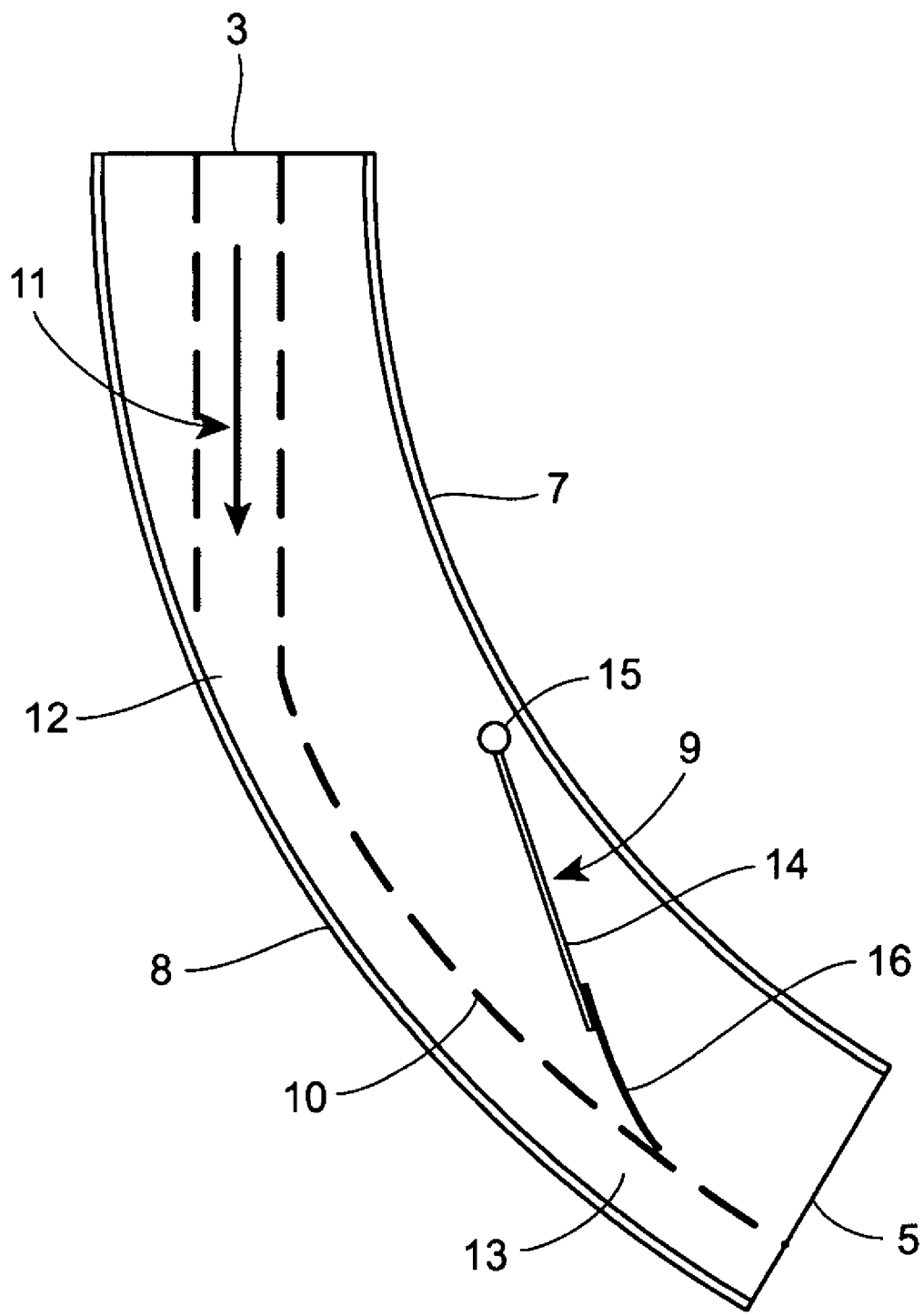

As can be clearly seen in FIG. 3 the product stream is discharged into the spoon from the loading spout at 11 and impacts the curved outer wall 8 at point 12. The provision of the air restrictive flap 9 further enhances the entrainment of the air stream into the product stream 13 exiting the outlet 5 and has been shown in experimental use to achieve a further 30% reduction in dust compared to the design without the flap.

The flap may be formed in any convenient manner, but in one example the flap is formed from a thin metal backing plate 14 mounted to the curved inner wall 7 either in a fixed manner or by way of a hinge 15. The trailing edge of the flap may be provided with a flexible rubber lip 16 to further enhance the fit of the trailing edge of the flap to the upper surface of the product stream 13.

Figure 4:
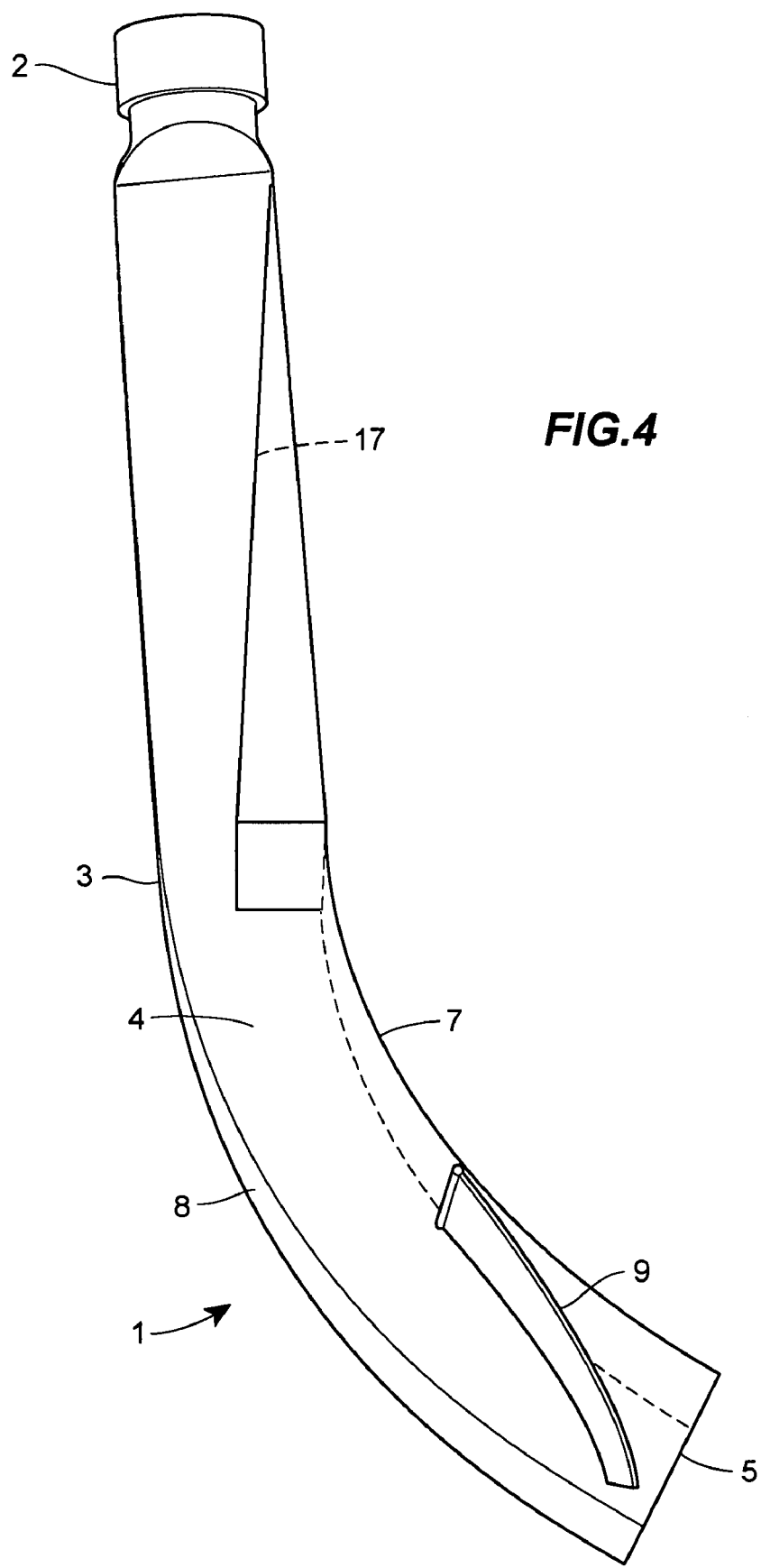

As a further optional feature, it has been found advantageous in some situations to concentrate the grain and direct the flow of grain from the loading spout 2 toward the outer curved wall of the loading spoon before the grain enters the curved portion. This configuration is shown in FIG. 4 where a converging duct 17 is provided immediately up stream of the curved loading spoon 1 arranged to direct the grain against the curved outer wall 8 at the inlet point 3. This may also have the effect of concentrating the grain, forcing the dust back into the product and accelerating the flow rate of the grain and entrained air, enhance the re-entrainment of the dust into the main product stream as the product passes through the curved duct 4.

By selecting a small inclination angle of the tapered duct 17 to the vertical axis, impact zones between the stream of grains and the wall may be significantly reduced. The area reduction through the tapered duct 17 also forces the stream of dust laden air to mix with the grain stream, hence reconcentrating the stream and reducing the amount of mobilized dust. The size of the area reduction should be carefully selected based on the expected product velocity and tonnage to avoid choking the chute.

Although FIG. 4 shows the tapered chute 17 used in combination with the air restrictive flap 9, it has been found in testing that the tapered chute 17 in combination with the curved spoon 4 may also be fully effective in concentrating the dust and that the air restrictive flap 9 had virtually no further impact on dust concentration levels. It would therefore appear that the effectiveness of the invention is enhanced by using either the tapered chute 17 or the air restrictive flap 9 but that the combination of the two has little further effect in re-entraining the dust.

Overall it has been found that concentrating the product stream using a curved discharge spoon and keeping the product velocities high has a far more beneficial effect on reducing dust than previous attempts to decelerate the product stream. The efficiency of the apparatus can be further enhanced by using either the tapered inlet duct 17 or the air restrictive flap 9.

Due to the high velocities, the dust is dragged down the vertical chute and consequently merges with the product stream in the curved spoon so that the discharge is more concentrated and streamlined than in previously known spoons, resulting in the dust being contained within the product stream. That is, the delivery of the product to the inlet of the curved duct at or above predetermined velocities may reduce dust emissions from the product, where the curvature of the duct correlates with the predetermined velocity of the product. As is understood, the velocity of the product may be controlled via the delivery source.

While the apparatus has been described for use in a grain loader, and in particular for the discharge of wheat into the holds of ships, it will be appreciated that the same principles can be applied in many other situations involving the handling of particulate commodities where dust is a problem, including the conveying of coal and the transfer of coal or other particulate material from one conveyor to another, or into a discharge hopper or stockpile.

Although the forgoing text sets forth a detailed description of numerous different embodiment, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. An apparatus for reducing dust emissions from particulate commodities during discharge from an outlet, comprising:
    a curved duct having an upward facing inlet and terminating in the outlet, wherein the outlet has an inclined, downwardly-facing orientation, and wherein the curved duct is enclosed from the inlet to the outlet;
    a continuously converging duct comprising an inner wall and a protrusion extending from the inner wall, the protrusion arranged to cause the continuously converging duct to deliver the particulate commodities into the curved duct at a location adjacent a curved outer wall of the curved duct and away from a curved inner wall of the curved duct; and
    a delivery source arranged to deliver particulate commodities under gravity to the inlet at least at a predetermined delivery velocity of at least 5 meters per second without additional driving force through the duct, thereby causing dust to arise from the particulate commodities,
    wherein the curvature of the curved duct is arranged to cause said dust to be re-entrained within the commodities as the commodities are diverted from a straight path by the curvature of the duct.

2. An apparatus as claimed in claim 1, wherein the curved duct comprises a substantially rectangular cross-section with substantially flat side walls, a curved inner wall corresponding to an inner radius portion of the curved duct and a curved outer wall corresponding to an outer radius portion of the curved duct.

3. An apparatus as claimed in claim 2, wherein a radius of curvature of the inner and outer walls is substantially constant throughout the curve.

4. An apparatus as claimed in claim 2, wherein a radius of curvature of the inner and outer walls varies over the curve such that the curvature of the curved duct is parabolic.

5. An apparatus as claimed in claim 4, wherein a tighter radius portion of the parabolic curve is positioned adjacent the inlet.

6. An apparatus for reducing dust emissions from particulate commodities during discharge from an outlet, comprising:
    a curved duct having an upward facing inlet and terminating in the outlet, wherein the outlet has an inclined, downwardly-facing orientation, and wherein the curved duct is enclosed from the inlet to the outlet; and
    a delivery source arranged to deliver particulate commodities under gravity to the inlet at least at a predetermined delivery velocity of at least 5 meters per second without additional driving force through the duct, thereby causing dust to arise from the particulate commodities,
    wherein the curvature of the curved duct is arranged to cause said dust to be re-entrained within the commodities as the commodities are diverted from a straight path by the curvature of the duct,
    wherein the curved duct comprises a substantially rectangular cross-section with substantially flat side walls, a curved inner wall corresponding to an inner radius portion of the curved duct and a curved outer wall corresponding to an outer radius portion of the curved duct, and
    wherein a portion of the curved inner wall comprises an air-restrictive flap extending inwardly into the curved duct upstream of the outlet and coupled to the interior of curved inner wall, the flap including a trailing edge arranged to rest in use just above the stream of particulate commodities issuing from the outlet.

7. An apparatus as claimed in claim 6, wherein the flap is hingedly connected to the curved inner wall such that the trailing edge can move toward or away from the curved outer wall depending on the volume of particulate commodities passing therebeneath at any point in time.

8. An apparatus as claimed in claim 6, wherein the trailing edge portion of the flap is flexible to automatically allow for changes in the mass flow rate of particulate commodities passing therebeneath.

9. An apparatus as claimed in claim 6, wherein a radius of curvature of the inner and outer walls is substantially constant throughout the curve.

10. An apparatus as claimed in claim 6, wherein a radius of curvature of the inner and outer walls varies over the curve such that the curvature of the curved duct is parabolic.

11. An apparatus as claimed in claim 10, wherein a tighter radius portion of the parabolic curve is positioned adjacent the inlet.

* * * * *